United States Patent
Robison et al.

(10) Patent No.: US 8,250,168 B2
(45) Date of Patent: *Aug. 21, 2012

(54) METHODS FOR ACCESSING PUBLISHED CONTENTS FROM A MOBILE DEVICE

(75) Inventors: Jeremiah Robison, San Francisco, CA (US); Benoit Schillings, Palo Alto, CA (US); Joseph E. Heitzeberg, Seattle, WA (US); James P. La Fleur, Mill Valley, CA (US)

(73) Assignee: Openwave Systems Inc., Redwood City, CA (US)

( * ) Notice: Subject to any disclaimer, the term of this patent is extended or adjusted under 35 U.S.C. 154(b) by 884 days.

This patent is subject to a terminal disclaimer.

(21) Appl. No.: 11/215,561

(22) Filed: Aug. 29, 2005

(65) Prior Publication Data
US 2006/0003754 A1    Jan. 5, 2006

Related U.S. Application Data

(63) Continuation-in-part of application No. 10/336,398, filed on Jan. 3, 2003, now Pat. No. 7,660,870.

(60) Provisional application No. 60/643,975, filed on Jan. 14, 2005.

(51) Int. Cl.
G06F 15/16 (2006.01)

(52) U.S. Cl. ........................ 709/217; 455/466

(58) Field of Classification Search ............. 709/217, 709/206; 455/466
See application file for complete search history.

(56) References Cited

U.S. PATENT DOCUMENTS

| | | | |
|---|---|---|---|
| 5,784,001 A | 7/1998 | Deluca et al. |
| 5,794,142 A | 8/1998 | Vanttila et al. |
| 5,941,946 A | 8/1999 | Baldwin et al. |
| 6,038,295 A | 3/2000 | Mattes |
| 6,133,985 A | 10/2000 | Garfinkle et al. |
| 6,243,443 B1 | 6/2001 | Low et al. |
| 6,456,854 B1 | 9/2002 | Chern et al. |
| 6,487,602 B1 | 11/2002 | Thakker |
| 6,612,488 B2 | 9/2003 | Suzuki |
| 6,728,530 B1 | 4/2004 | Heinonen et al. |
| 6,795,711 B1 | 9/2004 | Sivula |

(Continued)

FOREIGN PATENT DOCUMENTS
EP     0993165 A2    4/2000
(Continued)

OTHER PUBLICATIONS
Press Release: "FunMail Officially Launches its MMS Service on NTT DoCoMo's i-mode", Tokyo, Japan, May 21, 2002, 1 page.
(Continued)

*Primary Examiner* — Abdullahi Salad
(74) *Attorney, Agent, or Firm* — Morgan, Lewis & Bockius LLP

(57) ABSTRACT

Methods for accessing published content from a mobile device are described herein. In one aspect of the invention, an example of a process includes receiving a first message received from a mobile device over a network for accessing a destination, where the first message includes an identification associated with a destination and a predetermined indicator. In response to the first message, returning a second message to the mobile device, the second message including a link linking with a network-based resource associated with the destination. Other methods and apparatuses are also described.

18 Claims, 6 Drawing Sheets

U.S. PATENT DOCUMENTS

| | | |
|---|---|---|
| 6,832,102 B2 | 12/2004 | I'Anson |
| 2001/0034225 A1 | 10/2001 | Gupte et al. |
| 2001/0037381 A1 | 11/2001 | Vau |
| 2001/0056473 A1 | 12/2001 | Arneson et al. |
| 2002/0016174 A1 | 2/2002 | Gibson et al. |
| 2002/0026289 A1 | 2/2002 | Kuzunuki et al. |
| 2002/0042277 A1 | 4/2002 | Smith |
| 2002/0052912 A1 | 5/2002 | Griswold et al. |
| 2002/0055350 A1 | 5/2002 | Gupte et al. |
| 2002/0057678 A1 | 5/2002 | Jiang et al. |
| 2002/0115446 A1 | 8/2002 | Boss et al. |
| 2002/0126708 A1 | 9/2002 | Skog et al. |
| 2003/0003935 A1 | 1/2003 | Vesikivi et al. |
| 2003/0053608 A1 | 3/2003 | Ohmae et al. |
| 2003/0078058 A1 | 4/2003 | Vatanen et al. |
| 2003/0097410 A1 | 5/2003 | Atkins et al. |
| 2003/0135463 A1 | 7/2003 | Brown et al. |
| 2003/0135569 A1 | 7/2003 | Khakoo et al. |
| 2003/0145037 A1 | 7/2003 | Von Garssen |
| 2003/0172121 A1 | 9/2003 | Evans et al. |
| 2003/0200268 A1 | 10/2003 | Morris |
| 2003/0211856 A1 | 11/2003 | Zilliacus |
| 2003/0212601 A1 | 11/2003 | Silva et al. |
| 2004/0024846 A1 | 2/2004 | Randall et al. |
| 2004/0066419 A1 | 4/2004 | Pyhalammi |
| 2004/0075675 A1 | 4/2004 | Raivisto et al. |
| 2004/0083114 A1* | 4/2004 | Yue ..................... 705/1 |
| 2004/0087300 A1 | 5/2004 | Lewis |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0117255 A1 | 6/2004 | Nemirofsky et al. |
| 2004/0203970 A1 | 10/2004 | Rooke et al. |
| 2005/0162518 A1 | 7/2005 | Furon et al. |
| 2005/0193078 A1 | 9/2005 | Jordan |
| 2006/0256130 A1* | 11/2006 | Gonzalez ................. 345/619 |

FOREIGN PATENT DOCUMENTS

| | | |
|---|---|---|
| EP | 1 148 754 A2 | 10/2001 |
| EP | 1187425 A2 | 3/2002 |
| EP | 1233599 A2 | 8/2002 |
| JP | 2000250854 | 9/2000 |
| JP | 2002101369 A | 4/2002 |
| WO | WO 01/90937 A2 | 11/2001 |
| WO | WO 02/089448 A2 | 11/2002 |

OTHER PUBLICATIONS

Harry Newton, Newton's Telecom Dictionary, "E Wear / Earth Station", p. 285.

* cited by examiner

300

| Associated Info / Identifier | URL(s) | Optional Profile(s) | | Attributes |
|---|---|---|---|---|
| 415-123-4567 | www.WebSite1.com | ⋮ | ⋮ | ⋮ |
| 408-123-4567 | www.WebSite2.com | ⋮ | ⋮ | ⋮ |
| ⋮ | ⋮ | ⋮ | ⋮ | ⋮ |

Fig. 3

METHODS FOR ACCESSING PUBLISHED CONTENTS FROM A MOBILE DEVICE

RELATED APPLICATIONS

This application claims the benefit of U.S. Provisional Patent Application No. 60/643,975, filed Jan. 14, 2005, entitled "System for Publishing Information from a Mobile Associated with a Phone Number."

This application is also a continuation-in-part (CIP) of U.S. patent application Ser. No. 10/336,398, filed Jan. 3, 2003 now U.S. Pat. No. 7,660,870, entitled "Method and Apparatus for Enhancing Discoverability and Usability of Data Network Capability of a Mobile Device." The above-identified applications are incorporated herein by reference.

FIELD OF THE INVENTION

The present invention relates generally to mobile communications. More particularly, this invention relates to accessing published content from a mobile device.

BACKGROUND

Personal mobile communication/computing devices, such as cellular telephones, personal digital assistants (PDAs) and two-way pagers, have become commonplace in many countries. These devices can be collectively referred to as "mobile devices". Many of the latest generation of mobile devices provide their users with the ability to access resources on the Internet via wireless telecommunications networks (or simply, "wireless networks"). For example, some of these mobile devices allow their users to access World Wide Web pages, exchange email and download files over the Internet. Devices which can access the World Wide Web ("the Web") include a software application called a browser, which when implemented in a small (e.g., handheld) mobile device is sometimes more precisely referred to as a "minibrowser" or "microbrowser". An example of such a browser is the Openwave Mobile Browser produced by Openwave Systems Inc. of Redwood City, Calif.

Currently there is substantial interest in providing better ways for users to access published content and application services from their mobile devices. The term "content" in this context can refer to essentially any kind of information, such as text, images (e.g., graphics, photos, animations), video, sound, etc. One specific type of content, for example, is a Web page. There is significant interest in allowing users to browse the Web from mobile devices more efficiently. Current technology has a number of shortcomings in this regard, which discourage users from using the Web browsing capabilities of their mobile devices.

Specifically, a user of a mobile device (e.g., a mobile phone) has to memorize an address or URL (universal resource locator) of a network-based resource (e.g., a Web page) associated with another entity (e.g., another mobile device). In addition, given the limited keypad features of a mobile device, it is a burden for a user of a mobile device to remember the URL and to type in the URL using a keypad of the mobile device in order to access a Web page published by another entity from the mobile device.

SUMMARY OF THE DESCRIPTION

Methods for accessing published content from a mobile device are described herein. In one aspect of the invention, an example of a process includes receiving a first message received from a mobile device over a network for accessing a destination, where the first message includes an identification associated with a destination and a predetermined indicator. In response to the first message, a second message is returned to the mobile device, the second message including a link linking with a network-based resource associated with the destination.

In another aspect of the invention, an example of a processing system includes a message router to intercept a message received from a mobile client over a network, where the message includes an identification of a destination and a predetermined indicator. In response to the predetermined indicator, the message router accesses a database that stores a relationship between an identification and a link to a network-based resource of each of a plurality of clients. The message router determines a network-based resource associated with the destination based on the identification of the destination, and redirects the first message of the mobile client to the determined network-based resource of the destination.

In another aspect of the invention, an example of a process includes transmitting a first message via a call function of the mobile device to a server over a wireless network, where the first message includes an identification of a destination and a predetermined indicator indicating that the first message is not destined to the destination. In response to the first message, a second message is received from the server specifying a network-based resource associated the destination. In response to the second message, content from the network-based resource specified within the second message is downloaded.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3 is a block diagram illustrating an example of a mapping table according to one embodiment.

DETAILED DESCRIPTION

Figure 1:
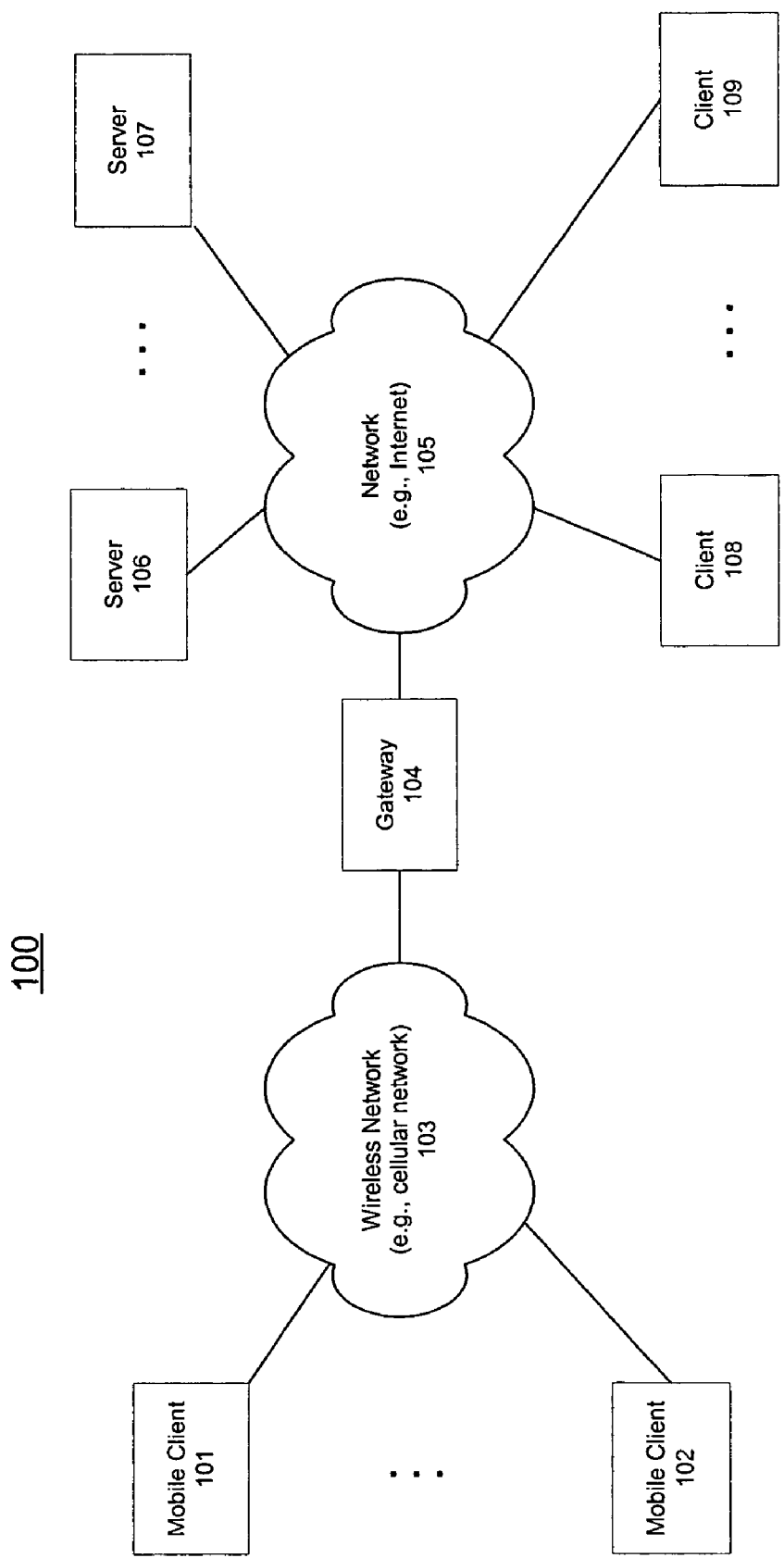
FIG. 1 is a block diagram illustrating a network configuration according to one embodiment of the invention.

Methods for accessing published content from a mobile device are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A user or an entity can publish certain content as a network-based resource available over a network, such as Internet. For example, a user or an entity may publish content in a Web page hosted by a Web server such that the Web page can be accessed over the Internet. Traditionally, a URL is used to access the Web page and a user typically types in the URL or via certain mapping mechanisms. However, the user who tries to access the published content is required to memorize the URL or a location providing the mapping services. This is typically difficult for a user of a mobile device, particularly a mobile phone, since a mobile device has limited input/output features. Although a bookmark may be used to link with a URL, a user has to specifically save the bookmark of the URL. When the URL of a destination changes, the user has to be aware and change the bookmark accordingly.

According to one embodiment of the invention, a user of a mobile device may transmit a message to a server, where the message includes an identification of a destination and a predetermined indicator. The predetermined indicator may be used to indicate that the message is not destined to the destination, but instead to access content published by a user or other entities associated with the destination. In response to the message, the server determines a link or a hyperlink (e.g., a URL link to a Web site hosting the published content of the destination) based on the identification of the destination and the predetermined indicator. The server then returns the link to enable linking with the network-based resource (e.g., a Web page) containing the published content of the destination to the mobile device. Thereafter, the mobile device can access the published content of the destination via the link returned from the server. The network-based resource may be hosted by the server or another server.

For example, according to certain embodiments of the invention, a user of a mobile phone may wish to access published content by another user or another entity. Instead of keying in a URL associated with the published content, the user needs only enter a phone number (e.g., an identification or ID) of the publisher (e.g., the phone number associated with another user or entity who publishes the content) followed by a predetermined indicator, either via a key pad of the mobile phone or via a voice activated command, etc. The predetermined indicator may include one or more characters in response to a key press from the keypad of the mobile phone or predetermined voice input. Alternatively, the predetermined indicator may include a media object attached (e.g., an audio clip, video clip, or a combination of both, etc.). In a particular embodiment, the predetermined indicator may include a "#" character following the phone number.

The user then transmits the phone number and the predetermined indicator to a dedicated server, which may be operated by a wireless telecommunications carrier of the wireless network in which the mobile phone operates, for example. The phone number and the predetermined indicator may be transmitted via a call or transmit function of the mobile phone, such as, for example, via a "call", "connect", or "send" key, or a voice activated command, etc. In response to the phone number and predetermined indicator, instead of directing the transmission to the destination (e.g., calling a phone associated with the phone number), the server may determine based on the predetermined indicator that the call is not directed to a destination associated with the phone number. Rather, the call requests to access a network-based resource.

The server then determines a link (e.g., a URL) associated with the dialed phone number and redirects the transaction to a network-based resource (e.g., a Web site) published by a user or entity associated with the phone number based on the predetermined indicator to allow the user of the mobile phone access the network-based resource published by the destination. The link may be determined based on a mapping mechanism (e.g., a lookup table) maintained or accessible by the server.

Note that throughout this application, a mobile phone is used as an example of a mobile device or a client initiating the transaction (e.g., initiate a call) and a phone number of a destination is used as an identification of the destination. The mobile device is not so limited. It will be appreciated that other devices such as a personal digital assistant (PDA) or a personal communicator (e.g., a Blackberry device), etc. may be utilized. In addition, other identifications of a destination, such as email addresses, may be used.

Further, the above techniques may also be applied to other types of communications including commercial transactions. According to certain embodiments of the invention, an enterprise entity may publish their information on a Web site. A customer of the enterprise entity, instead of looking up the URL of the Web site, the customer may simply dial the phone number associated with the enterprise entity followed by a predetermined indicator. In response, a server associated with the wireless telecommunications carrier may determine that the call is not destined to a phone of the enterprise entity based on the predetermined indicator. Rather, the call is directed to access a network-based resource associated with the enterprise entity. The server then determines a link (e.g., a URL) associated with the network-based resou and redirects the transaction to a network-based resource (e.g., a Web site) published by the enterprise entity. The link may be determined based on a mapping mechanism (e.g., a lookup table) maintained or accessible by the server. As a result, the customer may not need to memorize the URL of the enterprise entity and the enterprise entity does not need to purchase an expensive domain name in order for a user to remember the URL easily.

For example, a restaurant may publish their menu in a Web site. Instead of looking for the Web site (e.g., URL), a user of phone (e.g., either a mobile phone or a conventional phone) may dial a phone number associated with the restaurant, since the user may normally call and request certain items for home delivery or make a reservation, etc. and the phone number is easily remembered or stored within the phone. In addition, after the phone number is entered, the user may enter a predetermined indicator, such as, for example, one or more "#" key presses. In response, a dedicated server or call center intercepts the call and redirects the call to the Web site associated with the phone number (e.g., the restaurant) and the user can access the published content of the restaurant. In that situation, the user may order from the Web page using the mobile phone.

In another example according to one embodiment, a user may dial a phone number of an airline with a predetermined indicator to access a Web site associated with a airline containing the status of the flight schedule for the airline. In addition, the user may further enter a flight number to access the status of a particular flight of the airline. Similarly, in another example according to an alternative embodiment, a user may enter a phone number of a movie theater followed with a predetermined indicator in order to browse the movie schedules of the theater.

Further, according to a further embodiment, the above techniques may be applied to an ordinary client browser (e.g., a PC browser, such as Internet Explorer from Microsoft or Netscape Communicator from Netscape Communications). For example, from an ordinary browser, a user may type in a phone number of a branch office of an organization, such as, for example, as follows:

1234567890.Enterprise_Headquarters.com where "1234567890" may be a phone number or a numeric identification of the branch office.

In response, a server operated by the headquarters of the organization (e.g., www.Enterprise_Headquarters.com) may redirect the client browser to a Web site of a branch office associated with the phone number or the identification. Alternatively, the headquarters Web site may be a telecommunications carrier's website, where the phone number is assigned to a client of the telecommunications carrier. Furthermore, the redirecting Web site may be a dedicated server for purposes of redirecting. The server or Web site may maintain or access a mapping mechanism for mapping a phone number or other identification with a Web site containing published content of a member associated with the phone number or the identification, similar to the one shown in FIG. 3. Other configurations may be applied.

FIG. 1 is a block diagram illustrating a network configuration in which the invention can be implemented according to one embodiment. Referring to FIG. 1, in one embodiment, network configuration 100 includes one or more mobile clients 101-102 (also referred to as mobile devices) coupled to a wireless network 103. The wireless network 103 is coupled to another network 105 (e.g., a wired network) via a gateway 104 (also referred to as a network access device). Other entities such as one or more servers 106-107 and clients 108-109 may be coupled to network 105.

In one embodiment, each of the mobile devices 101-102 may be, for example, a cellular telephone, personal digital assistant (PDA), a portable personal computer (PC), personal communicator (e.g., a Blackberry compatible device or a two-way pager), or a combination of these. The wireless network 103 may be implemented as one of the variety of wireless technologies, such as, for example, global system for mobile communications (GSM), universal mobile telecommunications system (UMTS), personal communications service (PCS), time division multiple access (TDMA), code division multiple access (CDMA), and other mobile network transmission technologies. Alternatively, the wireless network 103 may be implemented using short-range wireless technologies, such as Bluetooth, wireless local area network (WLAN) (e.g., IEEE 802.11, etc.), infrared (IR), etc.

Network 105 may include one or more landline networks, which may include a global area network (GAN) such as the Internet, one or more wide area networks (WAN), and/or local area networks (LAN), etc.

Gateway 104 may be used as one or more gateway servers to connect wireless network 103 to network 105. Such gateway servers have been used, among other things, to facilitate access by mobile devices such as mobile devices 101-102 to the World Wide Web. For example, a gateway server capable of supporting these functions can be implemented by using the MAG Server software, available from Openwave Systems, Inc. of Redwood City, Calif., with conventional server computer hardware.

One or more of the servers 106-107 may be implemented as dedicated servers (e.g., Web hosting servers) to host content (e.g., Web pages) published by devices 101-102, as well as clients 108-109. Alternatively, one or more dedicated servers may be coupled to the wireless network 103, wired network 105, or both. Furthermore, one or more dedicated servers may be coupled to or built as a part of gateway 104. Note that the configuration shown in FIG. 1 is demonstrated as an example only. It will be appreciated that other configurations may be implemented.

According to one embodiment, communications between gateway 104 and any of the servers 106-107 and clients 108-109 may be performed by using HTTP (hypertext transport protocol) and TCP/IP protocols, where content of the communications may be written in XML (extensible markup language). In addition, in one embodiment, the gateway 104 communicates with the wireless network 103 using XML over short message peer-to-peer protocol (SMPP) or WAP (wireless application protocol).

Of course, it is possible to use other protocols for communication between the wireless network 103 and gateway 104. For example, gateway 104 may communicate directly with the wireless network 103 using XML over SS7. As another example, TCP/IP may be used to connect to some of the network nodes directly. Similarly, session initiation protocol (SIP) or wireless village (WV) initiative compatible protocols may be utilized.

According to one embodiment, any of the devices 101-102 and 108-109 may publish content, which may be hosted by one or more of the servers 106-107. For example, the devices 101-102 and 108-109 may publish their content using a variety of protocols, such as, for example, SIP, WAP, or MMS (Multimedia Messaging System), etc. Similarly, any one of the devices 101-102 and 108-109 may subscribe or access the published content using one or more of the techniques set forth above.

For example, mobile client 102 may publish its content in server 106. According to one embodiment, instead of accessing server 106 via a URL of the server 106, mobile client 101 may enter a phone number of mobile client 102 followed by a predetermined indicator, such as, for example, one or more "#" keys. This information may be entered using a keypad of mobile client 101 or via one or more voice activated commands. Once this information is entered, the mobile client 101 invokes a call or transmit function of the mobile client 101. In response, instead of dialing the entered phone number of the mobile client 102, the handset of mobile client 101 may just transmit (e.g., POST) the phone number of mobile client 102 and the predetermined indicator to a dedicated server (e.g., network access device 104) that contains a mapping mechanism for mapping a phone number of a mobile client and the URL associated with the respective client.

In this case, the dedicated server may return a URL of server 106 to mobile client 101 to enable the mobile client 101 to access the content hosted by server 106 and published by mobile client 102 via the returned URL. According to certain embodiments, the server containing the mapping mechanism may be coupled to network 103, network 105, or both. Alternatively, some or all of the clients 101-102 and 108-109 may maintain a local mapping table for mapping an identification of a destination with a URL and periodically update the mapping information with a remote server. In addition, according to one embodiment, the mapping table associated with a client may maintain the mapping primarily for the contacts shown within an address book or an organizer, etc. Further, the mapping information may be provisioned (e.g., updating a phone number or URL, etc.) remotely by a respective client or an administrator. Other configurations may exist.

Figure 2:
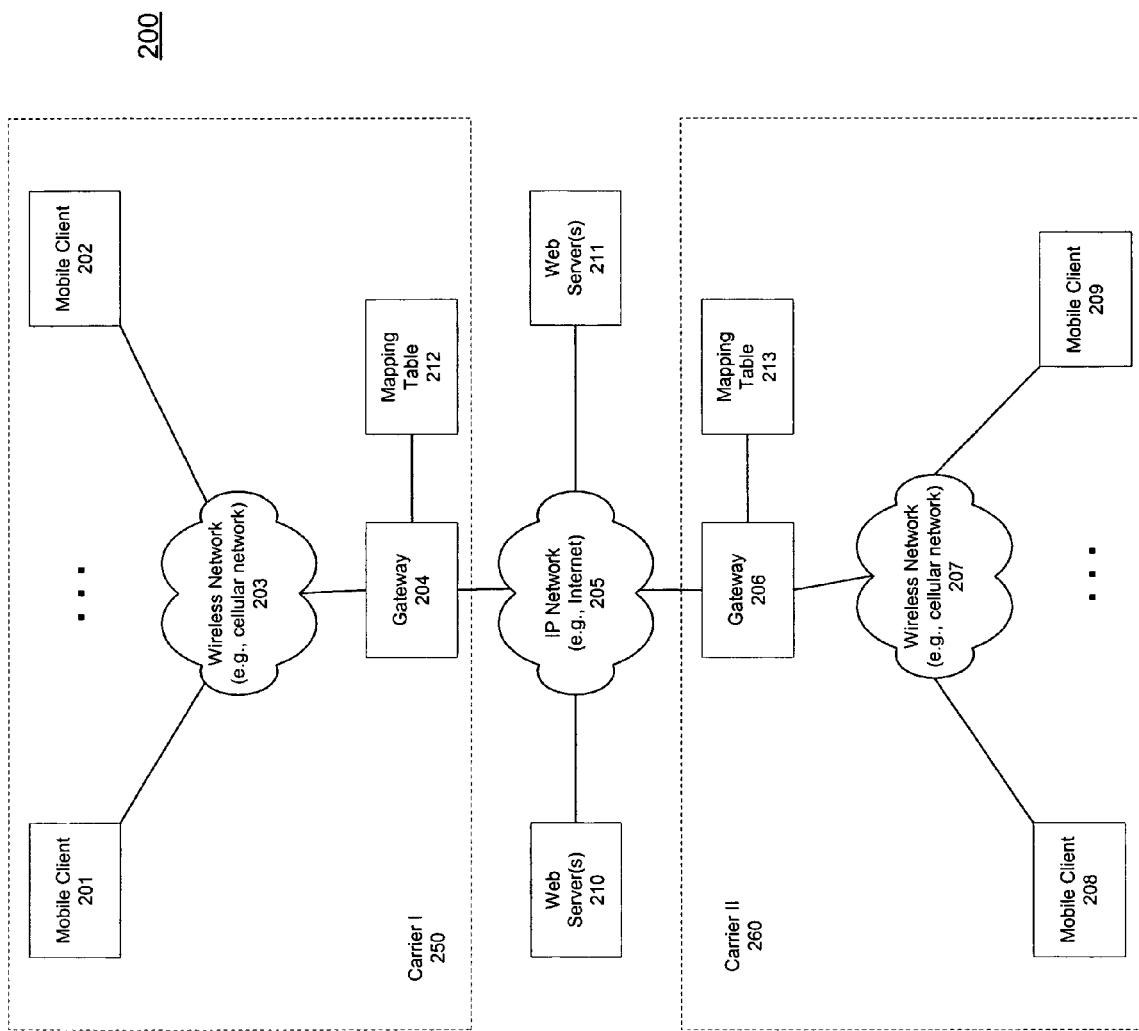
FIG. 2 is a block diagram illustrating a network configuration according to another embodiment of the invention.

FIG. 2 is a block diagram illustrating a network configuration in which the invention can be implemented according to another embodiment. Referring to FIG. 2, the network configuration example 200 includes a first wireless network 203 and a second wireless network 207 coupled to IP network 205 via gateways 204 and 206 respectively. The first wireless network 203 having clients 201-202 is provided by a first wireless carrier 250 and coupled to the IP network 205 via a gateway 204. Similarly, the second wireless network 207 having clients 208-209 is provided by a second wireless carrier 260 and coupled to the IP network 205 via a gateway 206. In addition, one or more Web servers 210-211 are coupled to the IP network 205. The Web servers 210-211 may be used to host the published content from any one of the clients 201-202 and 208-209, as well as other wired or wireless clients (not shown).

Wireless networks 203 and 207 may be implemented as part of wireless network 103 of FIG. 1 and IP network 205 may be implemented as part of network 105 of FIG. 1. Any of the clients 201-202 and 208-209 may be implemented as any of the mobile clients 101-102 of FIG. 1. Similarly, any of the Web servers 210-211 may be implemented as any of the servers 106-107 of FIG. 1 and, the gateways 204 and 206 may be implemented as part of gateway 104 of FIG. 1.

Further, each of the gateways 204 and 206 may access mapping tables 212 and 213 respectively to determine the mapping between their respective clients 201-202 and 208-209 and the URL of the Web pages hosted by one or more of Web servers 210-211. For example, the mapping table 212 may contain mapping between a phone number of clients 201-202 and a URL of a Web page containing their published content, which may be hosted by one or more of Web servers 210-211. Similarly, the mapping table 213 may contain mapping between a phone number of clients 208-209 and a URL of a Web page containing their published content hosted by one or more of Web servers 210-211.

The mapping tables 212 and 213 may be implemented similar to the mapping table example 300 of FIG. 3. The mapping tables 212 and 213 may be maintained within gateways 204 and 206 respectively. Alternatively, mapping tables 212 and 213 may be maintained by a respective dedicated server coupled to the wireless networks 203 and 207 accessible by gateways 204 and 206. Furthermore, mapping tables 212 and 213 may be maintained within a dedicated server shared and accessible by gateways 204 and 206. Other configurations may exist. The mapping tables 212 and 213 may be provisioned by any of the clients 201-202 and 208-209, as well as an administrator of network 203 or 207, etc. for the purposes of updating the mapping information.

Figure 4:
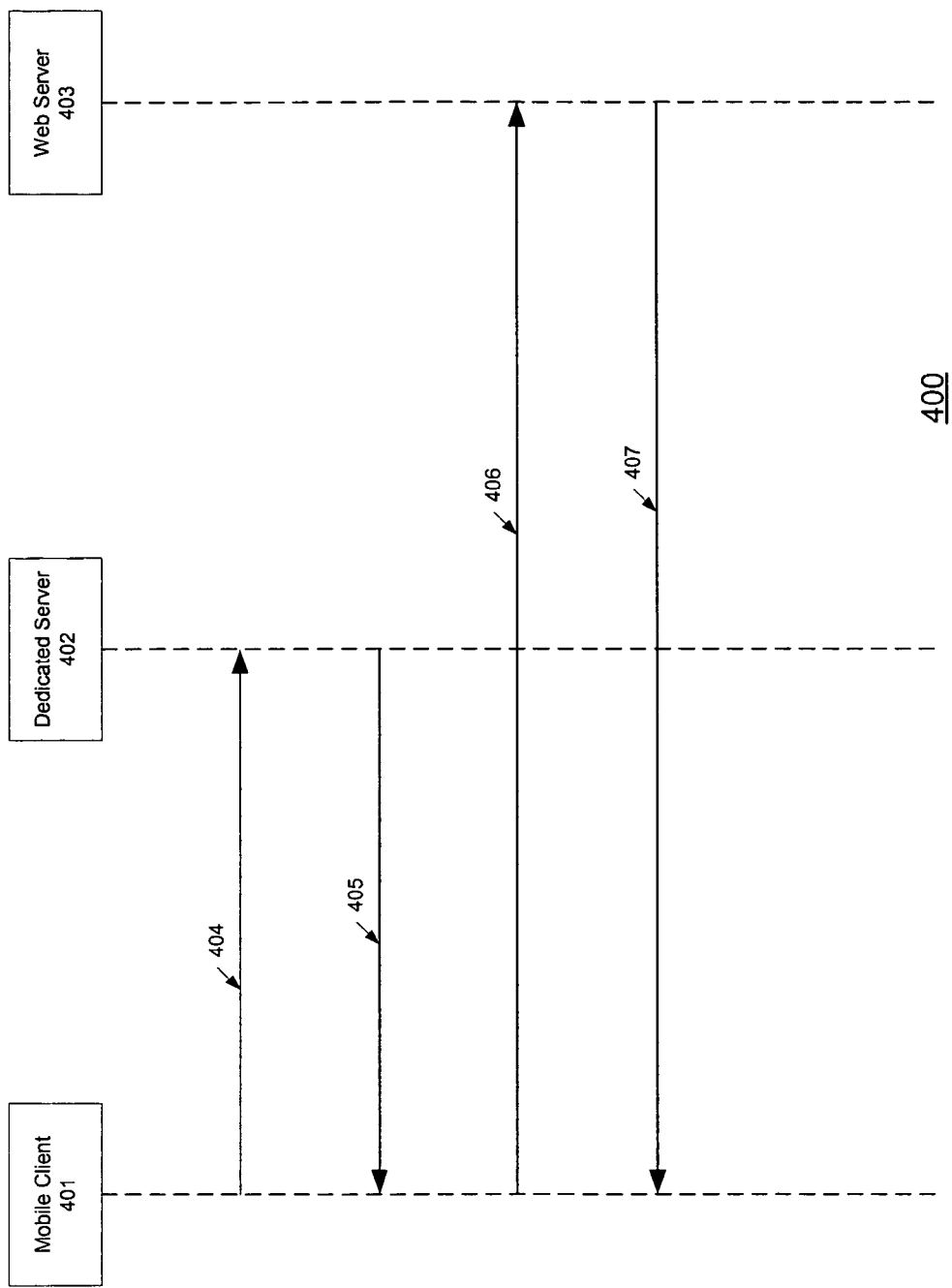
FIG. 4 is a flow diagram illustrating an example of a process for accessing published content from a mobile device according to one embodiment of the invention.

FIG. 4 is a flow diagram illustrating an example of a process for accessing published content from a mobile device according to one embodiment. In this embodiment, most of the transactions may be performed within the same carrier's network, such as, for example, carriers 250 and 260 of FIG. 2. For example, referring to FIG. 4, mobile client 401 may be implemented as any one of mobile clients 201-202 of FIG. 2. Dedicated server 402 may be implemented as a server having the mapping table 212 or as part of gateway 204 capable of accessing the mapping table 212. The dedicated server 402 may be coupled to the wireless network 203, IP network 205, or the both. Web server 403 may be used to host content published by the mobile client 401.

Referring to FIG. 4, according to one embodiment, it is assumed another client or entity has published content in Weber server 403 using a variety of protocols, such as, for example, SIP or WAP, etc. When mobile client 401 attempts to access the published content by another client or entity, at operation 404, the mobile client 401 transmits a first message to server 402 containing an identification of the other client or entity (e.g., phone number) and a predetermined indicator using a variety of techniques set forth above. Server 402 may or may not be associated with a gateway (e.g., gateway 204) of a wireless network associated with the mobile client 401.

In response to the first message, server 402 determines that the first message is not destined to the user associated with the identification based on the predetermined indicator (e.g., it is not an ordinary voice call). Rather, server 402 identifies a link, such as, for example, an address or URL, of server 403 hosting the published content of the user associated with the identification, for example, using a mapping table 212 of FIG. 2. At operation 405, server 402 then returns a second message containing the address or URL of server 403 to the mobile client 401. Thereafter, the mobile client 401 may access the server 403 via the link during operation 406 and download the content from the server 403 during operation 407. Other operations may also be included.

Note that the process example 400 of FIG. 4 may be used between two mobile clients such as mobile clients 201 and 202 of FIG. 2 within the same carrier network, where the gateway 204 may maintaining or access the mapping table 212 (e.g., server 402 of FIG. 4).

In certain configurations, as shown in FIG. 2, a mobile client of a carrier network may access content published by another mobile client of another carrier network. For example, referring to FIG. 2, the mapping table 212 may maintain the mapping for mobile clients 201-202 and mapping table 213 may maintain the mapping for mobile clients 208-209. When a first mobile client (e.g., mobile client 201) of a first carrier network (e.g., network 203) tries to access the content published by a second mobile client (e.g., mobile client 209) of a second carrier network (e.g., network 207), gateways 204 and 206 may communicate with each other to obtain the mapping information of a client of the other carrier network. Further, the gateways 204 and 206 may cache a portion of the mapping of the other network.

Figure 5:
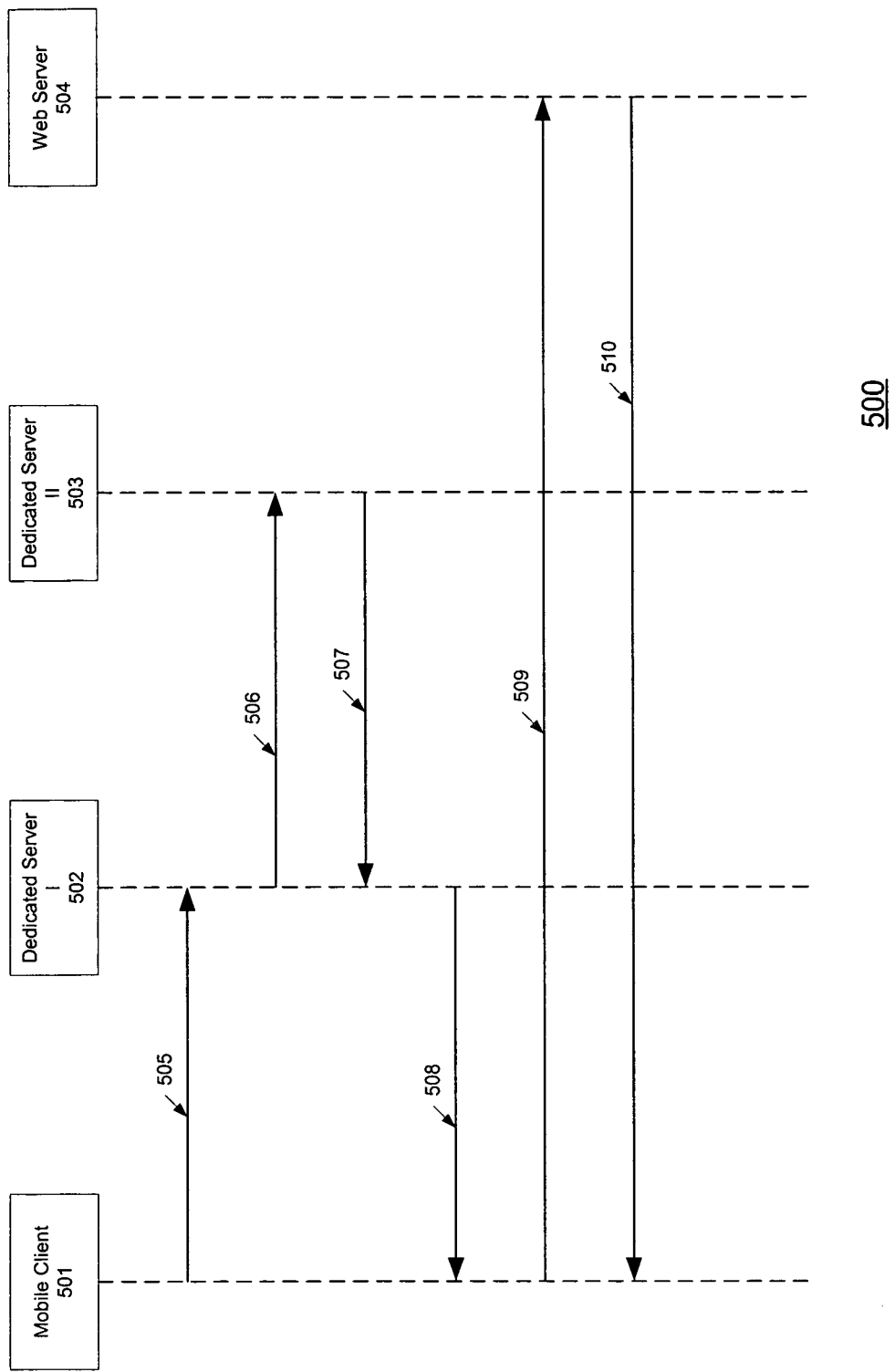
FIG. 5 is a flow diagram illustrating an example of a process for accessing published content from a mobile device according to another embodiment of the invention.

FIG. 5 is a flow diagram illustrating an example of a process for accessing published content from a mobile device according to another embodiment. Referring to FIG. 5, according to one embodiment, a mobile client may access the published content of another mobile client of another carrier network. In one embodiment, dedicated servers 502 and 503 may be implemented as gateways 204 and 206 respectively that can access or maintain the respective mapping tables 212-213, similar to the one shown in FIG. 3.

Referring to FIG. 5, when mobile client 501 attempts to access the content published by another user of another carrier network hosted by server 504, in operation 505, the mobile client 501 sends a first message containing a phone number of the other user and a predetermined indicator (e.g., one or more "#" keys) to server 502. Server 502 may be a gateway (e.g., gateway 204 of FIG. 2) interfacing the respective wireless network with another network. Alternatively, server 502 may be dedicated server having a mapping mechanism mapping a phone number with an address or URL of a network-based resource for each of the clients associated with a carrier network.

Server 502 may determine that the server 502 does not contain mapping information of a user associated with the phone number extracted from the first message. In operation 506, server 502 may communicate with server 503, which may be a gateway (e.g., gateway 206 of FIG. 2) of another carrier network of which the user associated with the phone number of the first message is a client. In operation 507, server 502 may receive the URL of Web server 504 from server 503 and in operation 508, server 502 forwards the URL back to the mobile client 501. Thereafter, in operation 509, the mobile client 501 may access Web server 504 and download the published content from Web server 504 in operation 510. Other operations may also be performed.

Figure 6:
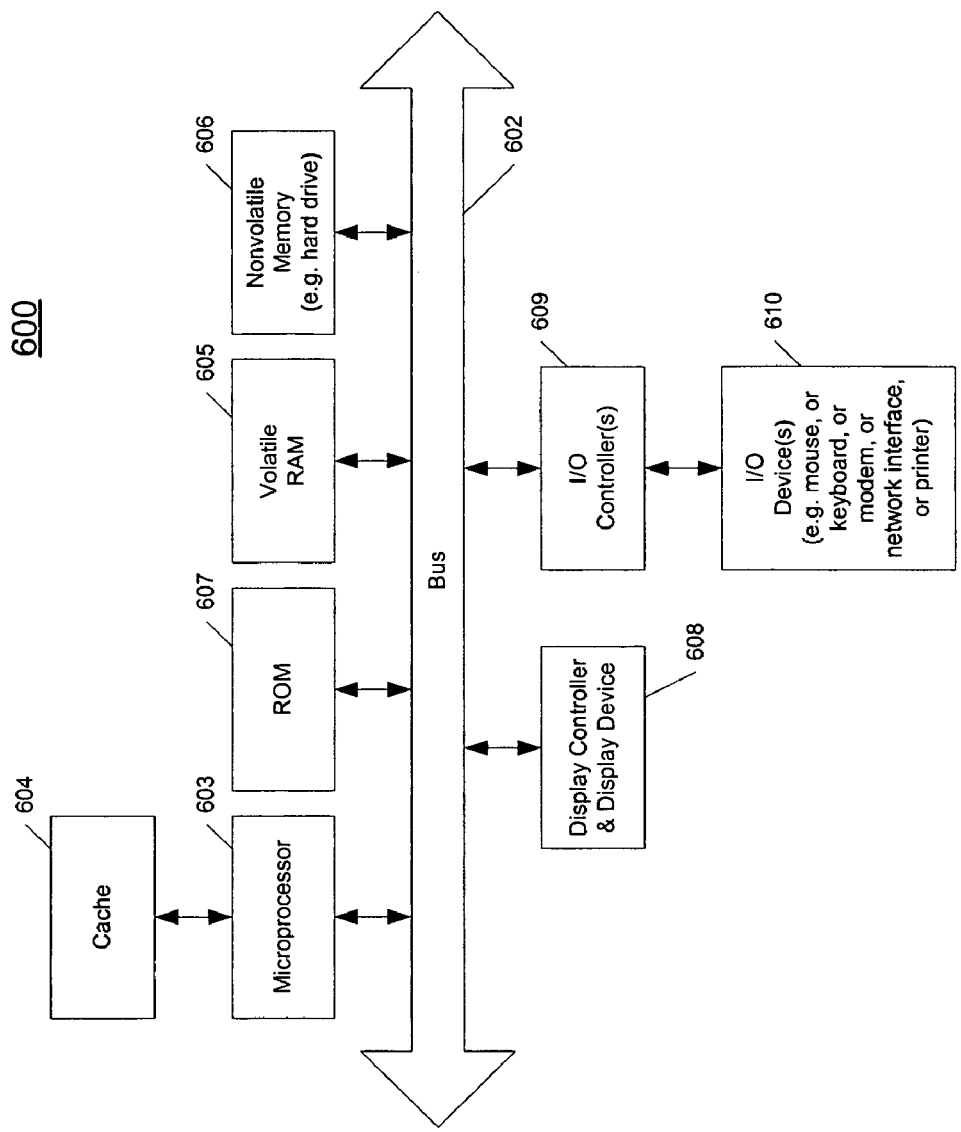
FIG. 6 is a block diagram of a digital processing system which may be used with one embodiment of the invention.

FIG. 6 is a block diagram of a digital processing system which may be used with one embodiment of the invention. For example, the system 600 shown in FIG. 6 may represent a client, such as clients 101-102 and 108-109 of FIG. 1 or clients 201-202 and 208-209 of FIG. 2. Alternatively, the system 600 may represent a server, such as servers 106-107 of FIG. 1 or servers 210-211 of FIG. 2. Furthermore, system 600 may represent as a gateway, such as gateway 104 of FIG. 1 or gateways 204 and 206 of FIG. 2.

Note that while FIG. 6 illustrates various components of a computer system, it is not intended to represent any particular architecture or manner of interconnecting the components, as such details are not germane to the present invention. It will also be appreciated that network computers, handheld computers, PDAs, personal communicators, cellular phones, and other data processing systems, which have fewer components or more components, may also be used with embodiments of the invention.

As shown in FIG. 6, the computer system 600, which is a form of a data processing system, includes a bus 602 which is coupled to a microprocessor 603 and a ROM 606, a volatile RAM 605, and a non-volatile memory 606. The microprocessor 603, which may be, for example, a PowerPC microprocessor from Motorola, Inc. or IBM, or a Pentium processor from Intel, is coupled to cache memory 604 as shown in the example of FIG. 6. Processor 603 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus 602 interconnects these various components together and also interconnects these components 603, 611, 605, and 606 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices. Other components may also be included.

According to certain embodiments of the invention, the non-volatile memory 606 may be used to store instructions when executed by processor 603, cause the processor to perform at least a portion of the operations set forth above. In addition, the non-volatile memory 606 may be used to store a mapping mechanism for mapping identifications (e.g., phone numbers) with links (e.g., URLs). Other configurations may exist.

Thus, methods for accessing published content from a mobile device have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, the present invention is not described with reference to any particular programming language. It will be appreciated that a variety of programming languages may be used to implement the teachings of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   at a server system having memory and one or more processors:
      receiving a first call from a first telephony device over a network for accessing a destination, the first call including a telephone number associated with the destination, wherein the telephone number is a telephone number that can be used to make ordinary voice calls to the destination;
      determining that a predetermined indicator has not been received in association with the first call, and, based on the determination, providing a voice call connection between the first telephony device and a party associated with said destination;
      receiving a second call from a second telephony device over a network for accessing said destination, the second call including said telephone number associated with said destination; and
      determining that the predetermined indicator has been received in association with the second call, and, based on the determination, returning a message to the second telephony device, the message including a link to enable linking with a network-based resource associated with the destination.

2. The method of claim 1, wherein the second telephony device is a first mobile device and the destination is a second mobile device, and wherein the telephone number associated with the destination is the telephone number of the second mobile device.

3. The method of claim 2, wherein at least one of the first and second mobile devices is a mobile phone, and wherein the predetermined indicator includes an input received from a user of the first mobile device.

4. The method of claim 3, wherein the input received from the user includes a character in response to a key press of a predetermined key of the first mobile device.

5. The method of claim 3, wherein the predetermined indicator is appended to the telephone number of the second mobile device.

6. The method of claim 5, wherein the first message is received via a call functionality of the first mobile device over the wireless network.

7. The method of claim 1, wherein the network-based resource includes a Web page hosted by a Web server, and wherein the link includes a URL corresponding to the Web page.

8. The method of claim 1, further comprising in response to the second call, determining the link of the network-based resource based on the telephone number and the predetermined indicator of the second call.

9. The method of claim 8, further comprising maintaining in a database a relationship between the telephone number of the destination and the link, wherein the link is determined based on a query within the database using the telephone number of the destination.

10. The method of claim 9, wherein the database comprises a lookup table to look up a relationship between a link of a network-based resource and a telephone number for each client having published content as a part of the respective network-based resource.

11. The method of claim 9, further comprising:
    receiving an update on the link from the destination over the network; and
    provisioning the relationship between the telephone number of the destination and the updated link.

12. A method performed by a network access device interfacing a wireless network and a wired network, the method comprising:
    receiving a first call from a first telephony device over the wireless network, the first call including a telephone number assigned to an end user of a destination of the first call, wherein the telephone number is a telephone number that can be used to make ordinary voice calls to the destination;
    determining that a predetermined indicator has not been received in association with said first call, and, based on said determination, providing a voice call connection to said destination;
    receiving a second call from a second telephony device over the wireless network, the second call including said telephone number assigned to the end user of said destination;
    determining that the predetermined indicator has been received in association with said second call, and, based on the determination, identifying a universal resource locator (URL) of a Web page hosted by a Web server coupled to the wired network having content published by a party associated with the destination based on the telephone number and the predetermined indicator received in association with the second call; and
    returning a message having the identified URL associated with the destination to the second telephony device over the wireless network to enable the second telephony device to access the content published by the party associated with the destination via the Web page associated with the URL.

13. The method of claim 12, wherein the predetermined indicator comprises a character in response to a key press associated with a predetermined key of the second telephony device, wherein the predetermined indicator is appended following the telephone number of the destination, and wherein the call is received via a call functionality of the second telephony device over the wireless network.

14. A processing system, comprising:
    a message router configured to:
       receive a first call from a first telephony device over a network, the first call being initiated by a telephone number of a destination of the first call, wherein the telephone number is a telephone number that can be used to make ordinary voice calls to the destination,
       determine that a predetermined indicator has not been received in association with the first call, and, based on said determination, provide a voice call connection to a party associated with said destination;

receive a second call from a second telephony device over the network, the second call being initiated by said telephone number of said destination;

determine that the predetermined indicator has been received in association with the second call, and, based on the determination, access a database storing a link to a network-based resource associated with the destination, and transmit the link to the second telephony device to allow the second telephony device client to access the network-based resource.

15. The system of claim 14, wherein the second telephony device is a first mobile phone and the destination is a second mobile phone, and wherein the telephone number of the destination is the telephone number of the second mobile phone.

16. The system of claim 15, wherein the predetermined indicator comprises an input received from a user of the first mobile phone.

17. The system of claim 16, wherein the input received from the user comprises a character in response to a key press of a predetermined key of the first mobile phone, and wherein the message is received via a call functionality of the first mobile phone.

18. The system of claim 14, wherein the network-based resource of the destination comprises a Web page hosted by a Web server.

* * * * *